US010007945B2

(12) United States Patent
Foerster

(10) Patent No.: US 10,007,945 B2
(45) Date of Patent: *Jun. 26, 2018

(54) SEARCHING FOR GOODS AND SERVICES BASED ON KEYWORDS AND PROXIMITY

(71) Applicant: Markus Foerster, Seattle, WA (US)

(72) Inventor: Markus Foerster, Seattle, WA (US)

(*) Notice: Subject to any disclaimer, the term of this patent is extended or adjusted under 35 U.S.C. 154(b) by 402 days.

This patent is subject to a terminal disclaimer.

(21) Appl. No.: 14/748,063

(22) Filed: Jun. 23, 2015

(65) Prior Publication Data
US 2015/0371311 A1 Dec. 24, 2015

Related U.S. Application Data

(63) Continuation of application No. 13/297,948, filed on Nov. 16, 2011, now Pat. No. 9,092,815.

(60) Provisional application No. 61/414,280, filed on Nov. 16, 2010.

(51) Int. Cl.
G06Q 30/06 (2012.01)
G06Q 30/00 (2012.01)
G06Q 30/02 (2012.01)

(52) U.S. Cl.
CPC ......... G06Q 30/0625 (2013.01); G06Q 30/02 (2013.01); G06Q 30/0623 (2013.01); G06Q 30/0627 (2013.01); G06Q 30/0639 (2013.01)

(58) Field of Classification Search
None
See application file for complete search history.

(56) References Cited

U.S. PATENT DOCUMENTS

| 3,857,987 | A | 12/1974 | Rogols et al. |
| 6,321,984 | B1 | 11/2001 | McCall et al. |
| 6,974,078 | B1 | 12/2005 | Simon |
| 7,945,484 | B1 | 5/2011 | Tam et al. |
| 7,962,470 | B2 | 6/2011 | Degenkolb et al. |
| 8,032,427 | B1 | 10/2011 | Spreen et al. |
| 9,092,815 | B2 * | 7/2015 | Foerster ............ G06Q 30/0625 |

(Continued)

OTHER PUBLICATIONS

Anon., "Stuff.com to Offer Most Comprehensive Product-Based Shopping Search Engine on Internet; Opens Virtual Doors Nov. 1 in Anticipation of Busy Holiday Shopping Season," Business Wire, Oct. 29, 1998.

(Continued)

Primary Examiner — Nicholas D Rosen
(74) Attorney, Agent, or Firm — Ellen M. Bierman; Lowe Graham Jones PLLC

(57) ABSTRACT

Techniques for keyword-based searching are described. Some embodiments provide a Merchant Information Search System ("MISS") that allows a potential customer to search for information about proximately located merchants that provide goods and/or services that match one or more keywords provided by the customer. In some embodiments, multiple keywords are associated with individual goods and/or services provided by a merchant. By associating keywords with individual goods and/or services, rather than a category or type of goods, the MISS may provide fine-grained search results that identify merchants that would not have been otherwise identified by category-based approaches to searching. Some embodiments employ other or additional techniques, including proximity-based searching and keyword feedback to improve search performance.

21 Claims, 11 Drawing Sheets

(56) References Cited

U.S. PATENT DOCUMENTS

| | | |
|---|---|---|
| 2002/0119791 A1 | 8/2002 | Bai |
| 2006/0085280 A1 | 4/2006 | Murnan et al. |
| 2007/0282879 A1 | 12/2007 | Degenkolb et al. |
| 2008/0002916 A1 | 1/2008 | Vincent et al. |
| 2008/0077471 A1 | 3/2008 | Musgrove et al. |
| 2008/0091443 A1 | 4/2008 | Strope et al. |
| 2008/0215456 A1 | 9/2008 | West et al. |
| 2009/0077841 A1 | 3/2009 | Ngo et al. |
| 2010/0205167 A1 | 8/2010 | Tunstall-Pedoe et al. |
| 2011/0040642 A1 | 2/2011 | O'Dell |

OTHER PUBLICATIONS

Hoffman, A., "Comparison Shopping Easy with On-Line Sites: Internet Offers Services That Match Consumers' Needs with Appropriate Products, Without Visiting Stores," Woth Magazine, Chicago Tribune, Chicagoland Final Edition 1, Mar. 18, 1999.

Cohen, A., "Shopping Bots," PC Magazine, vol. 18, Issue 13, p. 35, Jul. 1999.

\* cited by examiner

SEARCHING FOR GOODS AND SERVICES BASED ON KEYWORDS AND PROXIMITY

CROSS-REFERENCE TO RELATED APPLICATIONS

This application is a continuation of U.S. application Ser. No. 13/297,948, filed Nov. 16, 2011, titled "SEARCHING FOR GOODS AND SERVICES BASED ON KEYWORDS AND PROXIMITY", now U.S. Pat. No. 9,092,815, which claims the benefit of U.S. Provisional Application No. 61/414,280 filed Nov. 16, 2010, titled "SEARCHING FOR GOODS AND SERVICES BASED ON KEYWORDS AND PROXIMITY", both of which are incorporated herein by reference in their entireties.

TECHNICAL FIELD

The present disclosure relates to methods, techniques, and systems for searching for goods and/or services and, in particular, to methods, techniques, and systems for searching, based on keywords and proximity, for merchants that provide goods and/or services.

DETAILED DESCRIPTION

Figure 1:
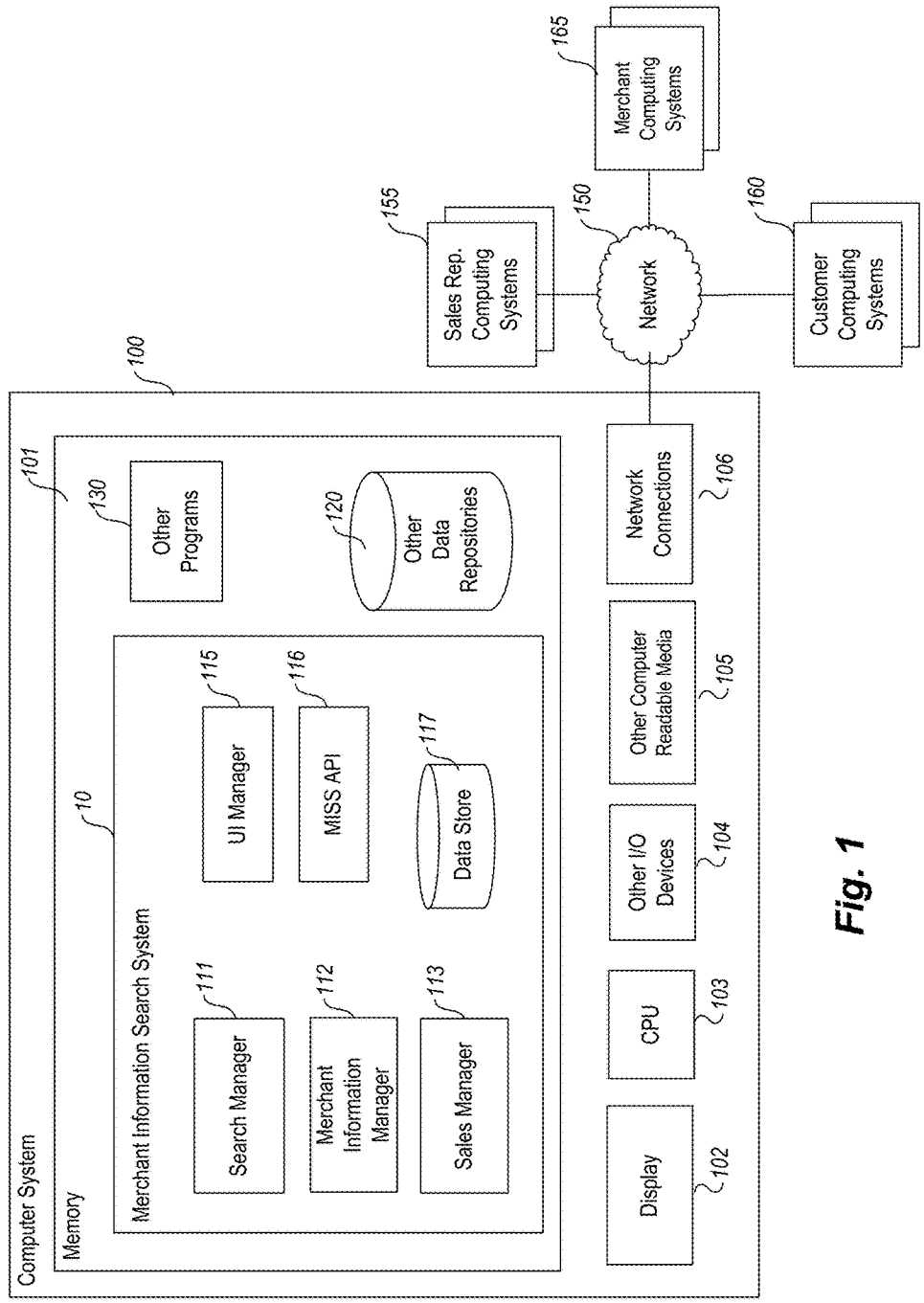
FIG. 1 is an example block diagram of an example computing system for implementing a merchant information search system according to an example embodiment.

Embodiments described herein provide enhanced computer- and network-based methods, systems, and techniques for searching, based on keywords and proximity, for merchants that provide goods and/or services. Example embodiments provide a Merchant Information Search System ("MISS"), which enables a potential customer to search for information about proximately located merchants that provide goods and/or services that match one or more keywords provided by the customer. The term "merchant" is used interchangeably herein with the terms "retailer" and "vendor," and includes any person or entity (e.g., a corporation, a partnership) that sells goods and/or services, whether in the retail or wholesale trade.

In some embodiments, a merchant provides the MISS with keywords that describe or otherwise indicate the goods and/or services that are provided by the merchant. In many cases, the merchant that uses the MISS is an entity that does not already have or operate an online and/or Internet presence, such as a Web site, a Web page, a blog, a messaging service (e.g., Twitter feed, mailing list), or the like. In addition, the MISS provides the merchant with the ability to provide multiple keywords that describe the goods or services of the merchant at relatively low cost, under various pricing models. The merchant can thus include many keywords that describe the individual goods or services of the merchant, including categories, types, classes, generic names, trade names, slang, stock keeping units, industry descriptors, and the like. The MISS thus stands in contrast to traditional directories (e.g., Yellow Pages) that typically classify a merchant in or (or at most a few) classes or categories. Because a merchant can provide the MISS with keywords describing any good or service of their business, the MISS can identify the merchant as a potential provider of a requested good or service, even though the merchant may not be primarily be classified (e.g., in a Yellow Pages directory) as a provider of goods of that type.

In some embodiments, the MISS can therefore advantageously provide information about merchants who may not primarily deal in goods or services of a particular type. For example, while a given supermarket may be primarily classified as a grocery store, it may also deal in other types of goods, such as hardware items (e.g., hammers, screwdrivers, string, fasteners). The supermarket can provide the MISS with keywords describing these hardware items (as well as the grocery items it carries), such that potential customers for hardware items can be attracted to the supermarket as a possible source for such items, even though the supermarket may not be primarily classified (e.g., in a Yellow Pages directory) as a dealer of hardware items.

The MISS also performs various of its functions based on proximity between a merchant and a potential customer. In particular, the MISS may use proximity to limit and/or order search results. For example, if a customer searches for a specified keyword, the MISS may provide indications of merchants that match the specified keyword and that are located within a predefined (or user-selected) radius of the current (or user-specified) location of the user. In addition, or in the alternative, the MISS may order search results based at least in part on proximity to the customer, such that merchants that are closer to the customer appear more prominently (e.g. earlier in a list, in larger type) than those that are further away from the customer.

1. Example Computing System

FIG. 1 is an example block diagram of an example computing system for implementing a merchant information search system according to an example embodiment. In particular, FIG. 1 shows a computing system 100 that may be utilized to implement a Merchant Information Search System ("MISS") 10.

Note that one or more general purpose or special purpose computing systems/devices may be used to implement the MISS 10. In addition, the computing system 100 may comprise one or more distinct computing systems/devices and may span distributed locations. Furthermore, each block shown may represent one or more such blocks as appropriate to a specific embodiment or may be combined with other blocks. Also, the MISS 10 may be implemented in software, hardware, firmware, or in some combination to achieve the capabilities described herein.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106. The MISS 10 is shown residing in memory 101. In other embodiments, some portion of the contents, some or all of the components of the MISS 10 may be stored on and/or transmitted over the other computer-readable media 105. The components of the MISS 10 preferably execute on one or more CPUs 103 and merchant information searching, as described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 1 may not be present in any specific implementation. For example, some embodiments may not provide other computer readable media 105 or a display 102.

In a typical embodiment, the MISS 10 includes a search manager 111, a merchant information manager 112, a sales manager 113, a user interface manager 115, a MISS API 116, and a data store 117.

The search manager 111 includes search logic for responding to search requests that include keywords. In one embodiment, the search manager 111 receives search requests from customers operating the customer computing systems 160. In response, the search manager 111 determines merchants that have associated keywords that match one or more keywords of the search request. The search manager 111 may also search and/or order results based on location. For example, the search manager 111 may receive an indication of a location (e.g., a customer's current or future location) and retrieve information about merchants, including merchants without an online presence, that are located within a specified radius of the indicated location.

The merchant information manager 112 manages information about merchants, including names, addresses, keywords, products, customer reviews, operating hours, and the like. In some embodiments, merchants operating the merchant computing systems 165 may provide this information directly to the merchant information manager 112. In other embodiments, at least some merchants interact indirectly with the MISS 10 via one or more sales representatives as described below.

The sales manager 113 manages and tracks information related to keyword sales made by sales representatives/associates. In some embodiments, sales representatives operating the sales representative computing systems 155 may assist the merchants in submitting merchant information (e.g., merchant names, addresses, keywords) to the MISS 10. The sales manager 113 may also track commissions or other rewards made to sales representative in return for obtaining merchant information.

The UI manager 115 provides a view and a controller that facilitate user interaction with the MISS 10 and its various components. For example, the UI manager 115 may provide interactive access to the MISS 10, such that sales representatives and/or merchants can provide merchant information, customers can provide search requests and receive search results, and the like. In some embodiments, access to the functionality of the UI manager 115 may be provided via a Web server, possibly executing as one of the other programs 130. In such embodiments, a user operating a Web browser or dedicated application (herein also referred to as an "app") executing on one of the computing systems 155, 160, or 165 can interact with the MISS 10 via the UI manager 315.

The API 116 provides programmatic access to one or more functions of the MISS 10. For example, the API 116 may provide a programmatic interface to one or more functions of the MISS 10 that may be invoked by one of the other programs 130 or some other module. In this manner, the API 116 facilitates the development of third-party software, such as user interfaces, plug-ins, news feeds, adapters (e.g., for integrating functions of the MISS 10 into other systems), and the like. In addition, the API 116 may be in at least some embodiments invoked or otherwise accessed via remote entities, such as one of the computing systems 155, 160, or 165, to access various functions of the MISS 10.

The data store 117 is used by the other modules of the MISS 10 to store and/or communicate information. Components 111-116 use the data store 117 to record various types of information, including merchant information (e.g., names, addresses, keywords, feedback), customer information (e.g., search history, feedback), sales representative information (e.g., names, addresses, sales records, payment records), and the like. Although the components 111-116 may be described as communicating primarily through the data store 117, other communication mechanisms are contemplated, including message passing, function calls, pipes, sockets, shared memory, and the like.

The MISS 10 interacts via the network 150 with sales representative computing systems 155, merchant computing systems 165, and customer computing systems 160. Systems 155, 160, and 165 may in some embodiments be standalone and/or mobile computing devices, including smart phones, PDAs, and the like. In some embodiments, mobile apps executing on one or more of the systems 155, 160, or 165 may be used to interact with the MISS 10. For example, a customer may operate a mobile app operating on a smart phone or other mobile computing system to obtain information about merchants via the MISS 10. Note also that even though merchant computing systems 165 are illustrated, merchants are not required to have or use a computing system (or even have an online presence) to be searchable via the MISS 10. The network 150 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

In an example embodiment, components/modules of the MISS 10 are implemented using standard programming techniques. For example, the MISS 10 may be implemented as a "native" executable running on the CPU 103, along with one or more static or dynamic libraries. In other embodiments, the MISS 10 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the MISS 10, such as in the data store 117, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 117 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the MISS 10 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

2. Example Process

Figure 2:
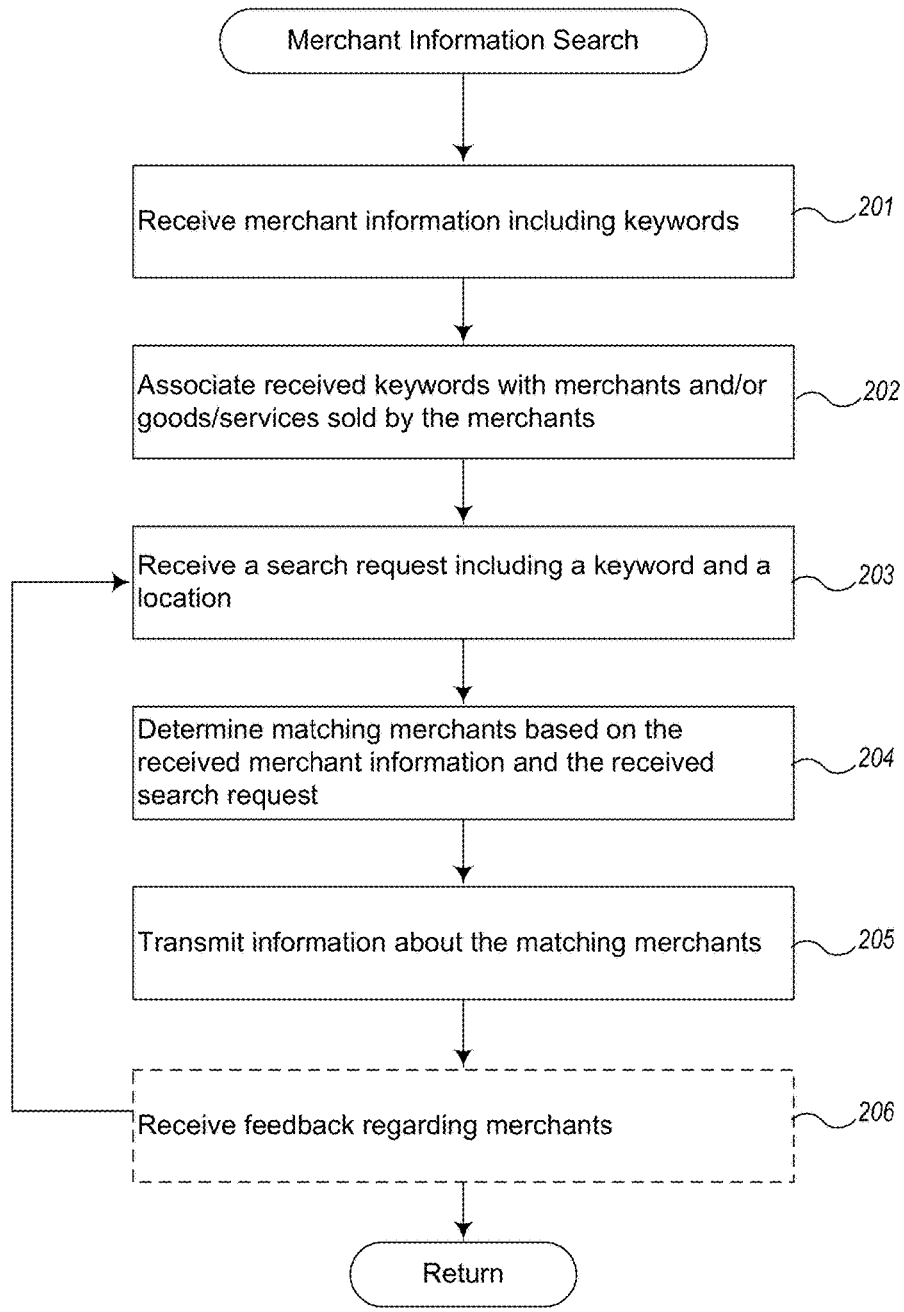
FIG. 2 is an example flow diagram of a merchant information search process performed by an example embodiment.

FIG. 2 is an example flow diagram of a merchant information search process performed by an example embodiment. The illustrated process may be performed, for example, by the MISS 10 of FIG. 1. The process facilitates the merchant information search process by receiving information about merchants, and then responding to search requests received from customers.

The process begins at block 201, where it receives merchant information including keywords. The merchant information may include additional information, such as contact information (e.g., addresses, telephone numbers), product/service descriptions, store hours, and the like. The information may be received directly from merchants, such as via a Web based interface utilized by the merchant. In other embodiments, the information is received from an intermediary, such as a sales associate who can assist (e.g., over the telephone, or via a mobile computer during the course of a personal visit) a merchant in submitting their merchant information. In this manner, merchants that do not have or operate an online presence can obtain the benefits of the MISS without the costs or other overhead associated with acquiring, generating, operating, and/or managing an online presence.

At block 202, the process associates received keywords with merchants. Associating the keywords may include storing a correspondence between the keyword and the merchant in an index or other data structure. Associating the received keywords may also or instead include associating (e.g., storing a correspondence between) a keyword with a good or service that is provided by the merchant.

At block 203, the process receives a search request including one or more keywords and a location indication. The search request may be received from a customer or potential customer who is searching for a merchant who is situated near the indicated location and who provides a good or service that matches or can be described by the provided keyword(s). In some embodiments, the indicated location may be provided automatically, such as via a GPS sensor that is part of a device the customer is using to initiate the search. In other embodiments, the customer specifies the location, such as by providing a zip code or other location indicator (e.g., street, city, state). The location need not be the customer's current location.

At block 204, the process determines matching merchants based on the received merchant information and the received search request. Determining matching merchants may include determining whether one or more of the keywords of the search request match (e.g., are identical to, approximately match) one or more keywords that are associated with the merchant and/or goods or services sold by the merchant. In addition, determining matching merchants may include finding one or more merchants that are located near the indicated location, such as by being within a specified radius (e.g., one mile, five miles, 10 miles) of the indicated location. In at least some cases, a determined merchant may not primarily deal in goods or services of the type indicated by the keyword. For example, a green grocer may have a primary business classification of selling produce, but may also sell baked goods, dry goods, beverages and the like. In some embodiments, a primary business classification may be the type or category of goods or services that comprise a majority of the revenues, profits, units sold, or the like, obtained by or attributed to the merchant. In some embodiments, a merchant may have multiple primary business classifications, such as the top N (e.g., top 3, top 5) types or categories of goods and services ranked by revenue, profits, units sold, or some other metric.

At block 205, the process transmits information about the matching merchants. Transmitting the information may include ordering the information, such as by ordering a list of merchants based on proximity between each of the merchants and the indicated location. The information may be ordered, arranged, or filtered based on other factors as well (or instead), such as based on a match score that is based on one or more of geographic proximity, number of keywords matched, types of keywords matched (e.g., category keywords, slang keywords, item keywords), type of matches (e.g., exact matches, approximate matches), and the like. The transmitted information may also include merchant rating information based at least in part on feedback received from customers who previously dealt with one or more of the matching merchants.

At block 206, the process optionally receives feedback regarding one or more of the matching merchants. Receiving feedback may include receiving feedback from a customer who submitted the search request, the feedback including information regarding the customer's experience with respect to the one or more merchants and/or keywords associated with the merchants (e.g., the keywords did or did not accurately describe the good or service sought).

After block 206, the process returns to block 203 to process additional search requests. Although the process is shown proceeding to block 203, it may instead or in addition proceed to other blocks, such as by proceeding to block 201 to receive information about additional merchants or by ending or returning from the process altogether. Furthermore, even though the process is shown proceeding from block 206 to block 203, it may in some embodiments or iterations instead return to block 203 (or some other block) earlier, such as from block 205.

3. Declassifind System

The following sections describe a system named the "Declassifind System," which includes an example embodiment of a MISS. The following generally describes various architectural components, data flows, and other aspects of an example embodiment of a MISS, including various processes used to implement an example MISS. It further describes various alternative or additional techniques that may be employed by various embodiments of an MISS. Other system organizations and process flows could also be used to implement the capabilities of an MISS.

"Declassifind" is a unique geographical-based Internet search engine process technology that includes techniques for the notification of the sale of services and products by "bricks 'n mortar" merchants, vendors, and/or retailers. The terms "merchant," "vendor," and "retailer" are used interchangeably herein, and include any person or entity (e.g., a corporation, a partnership) that sells goods or services. "Bricks 'n Mortar" vendors and merchants include vendors with physical "storefront" retail location(s) that provide customers with the potential ability to physically enter, peruse, select, sample, purchase and take/ship their purchased items with/to them. Declassifind "declassifies" or removes both the limitations posed by classification-based search methods (e.g., traditional regional Yellow Pages) and the limitations posed by current single/multiple Advertisement-word Internet listings provided by search engines and/or other Web sites (e.g., Google's "Adwords"). Declassifind provides greater consumer visibility to physically located bricks 'n mortar vendors and retailers and their services and/or products for sale. Declassifind provides vendors and retailers the ability to inexpensively post a plethora of extensive and comprehensive descriptors and/or keywords on the Internet about themselves and/or their goods/services without having to commission dedicated Web sites, register limited and expensive individual Advertisement-words or classifications, reserve Internet domain-names, construct Web pages associated with their business and/or location, or the like.

3A. Benefits: Vendors and Retailers

Declassifind advantages vendors and retailers by providing techniques for consumers and users to search widely on vendor-listed keywords and descriptors prioritized by a user's location and proximity to that vendor in a selected geographic radius. Declassifind provides these retailers/vendors the potential to list comprehensive and markedly fuller listings of their goods and services available through inexpensive keywords including brands, names, item descriptions, trade names, keywords, industry specific associations, slang, lingo, model numbers, SKU's—virtually anything that consumer might search for towards the aim of vendors/retailers increasing their revenue, profitability or market share. The advantage of Declassifind to retailers/vendors is found in users performing these searches prioritized by proximity without the constraints of traditional classification-based searches used by a significant number of product and service location services, or the constraints of limited and expensive single/multiple Advertisement-words that do not prioritize listings necessarily by proximity to users.

Figure 3:
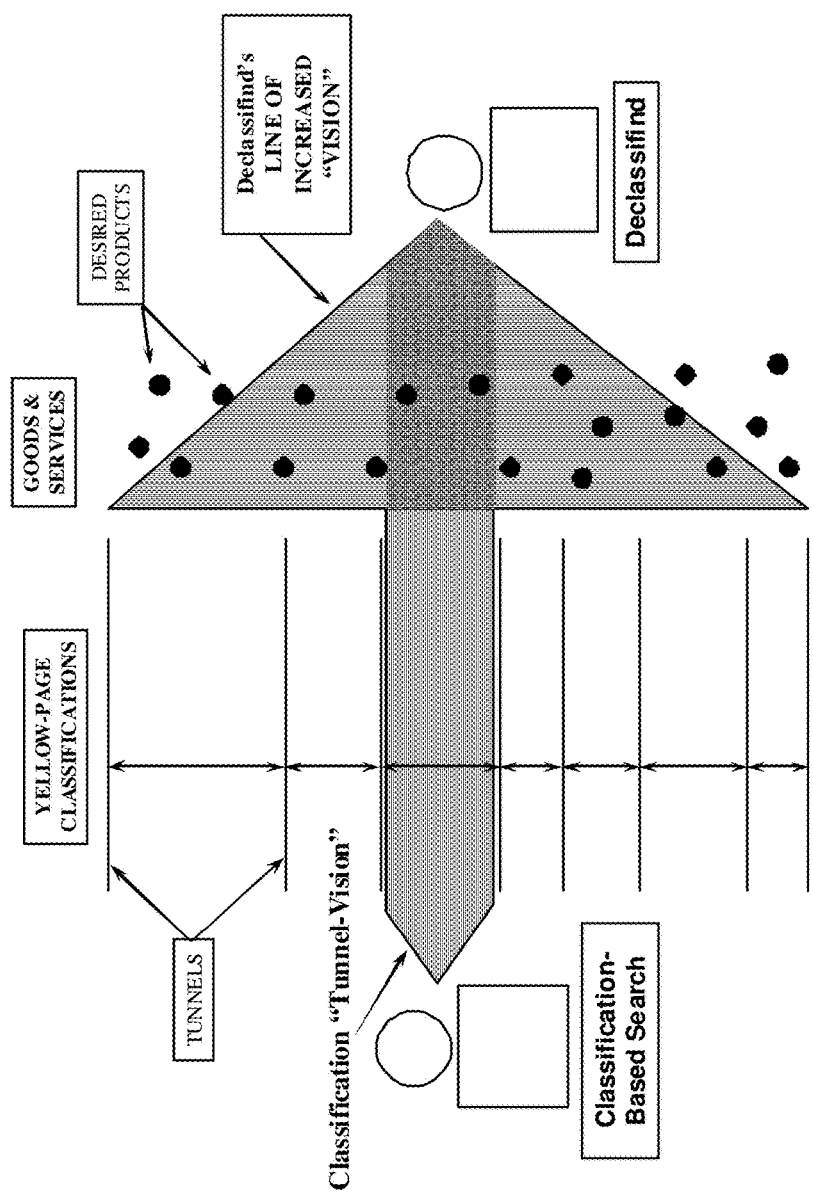
FIG. 3 illustrates fine-grained good and service visibility provided by one embodiment.

FIG. 3 illustrates fine-grained good and service visibility provided by one embodiment.

Declassifind avoids the classifications of traditional goods and service search methods and enables vendors to directly list their products and services without the constraints of a classification system and to broaden their product/service listing from the single "pigeon-holed" classification to a limitless number of key and product words. Whereby merchants typified and classified under one classification might carry or cross-sell a desired product/service not typically associated with their particular retail classification, these merchants' products will not likely be found by a consumer searching through traditional classification methods. Declassifind provides vendors with techniques to quickly eliminate the single "pigeon-hole" and give vendors the ability to list across all classifications and, through the Declassifind's "increased line of vision," give visibility to all their products, regardless of classification.

Vendors utilizing the Declassifind system to list keywords and descriptors will also have the advantage of optimizing the popularity and frequency of searches on their keyword/descriptor listings through on-demand queries and also through regularly generated and distributed reports on the keywords and descriptors that users query to the Declassifind system. This ability is provided through Declassifind's recording the quantity of searches performed on the vendor's keywords and descriptors and associated geographical locations of users and the date/time that the searches are performed. On-demand search queries by vendors are input into a custom query-input interface and reports generated by submitting various parameters associated with users' searches. Regularly generated reports are run on a monthly or other preset frequency and designed to report on a preset standard number of keywords and descriptors that are most often searched on by users, thereby allowing vendors to optimize and hone their listings in reaching their desired target markets, thereby increasing their revenue, profitability or market share.

3B. Benefits: Users

Declassifind advantages users by providing them techniques to search widely on vendor-selected keywords and descriptors in a selected geographic radius. Declassifind provides consumer users the potential to search keywords including brands, names, item descriptions, trade names, keywords, industry specific associations, slang, lingo, model numbers, SKU's—virtually anything that consumer might search for towards the aim of consumers locating desired goods and/or services in a selected geographic area.

Declassifind avoids the classifications of traditional goods and service search methods and takes consumers directly to their desired products through enabling them to see beyond the single "pigeon-holed" classification schemes through to a limitless number of key and product words. Whereas users looking for a product or service generally found with merchants typified under one particular classification might not search for that product or service with other merchants also carrying that particular product typified under other classification schemes, these merchants' products may be found by a consumer searching utilizing the Declassifind system that avoids traditional classification methods. Declassifind can quickly "cut across" and "see through" all classifications and, through this Declassifind's "increased line of vision," give users visibility to all desired products, regardless of classification (refer to FIG. 3).

Figure 4:
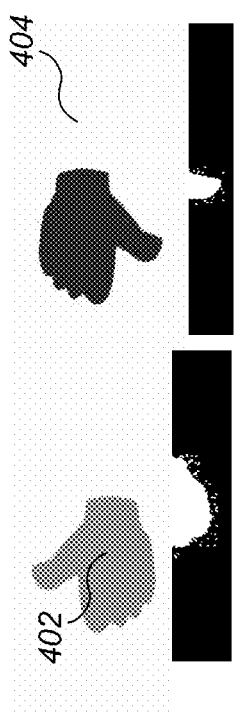
FIG. 4 illustrates feedback controls provided by some embodiments.

FIG. 4 illustrates feedback controls provided by some embodiments. Declassifind enables users to provide comments/feedback to vendors and other users on their selection and choice of keywords and descriptors. In addition, Declassifind provides techniques for visually and immediately evaluating vendors through prior user feedback and comments submitted on vendors/retailers through a binary-choice evaluation mechanism of either thumbs-up or thumbs-down icons/images/controls as shown in FIG. 4.

Thumbs-up control 402 or thumbs-down control 404 are displayed adjacent to the retailer/vendor listing. The controls may be color coded. For example, thumbs-up control 402 may be colored green while thumbs-down control 404 may be colored red. Any retailer/vendor with user feedback/comments may have a color-gradated thumbs-up or thumbs-down down icon associated with them with the color and orientation of thumb determined via the calculation and algorithm described in the following paragraphs and FIG. 5. Retailers without any feedback may have no thumb icon associated with them until feedback is received on them. In other embodiments, retailers without feedback may be evaluated in other ways, such as by reference to third party evaluations (e.g., Consumer Reports reviews, complaints lodged by the Better Business Bureau, or the like). These color-gradated binary thumb images are based on prior user evaluation feedback on vendors and denote those prior users' ranking and/or rating of a vendor based on their overall experience with that vendor be it the keywords listed, ease of contacting, ease of locating, finding their desired product/service, service level received and anything else associated with that vendor that reflects the user's overall experiences with a particular vendor.

This user feedback/comments thumbs-up/down mechanism provides a forum to collect user experiences and opinions on vendors and/or their keywords. This in turn, ensures that vendors accurately list their keywords and descriptors thereby providing a self-policing and self-moderating mechanism whereby vendors/retailers are incentivized against listing unrelated keywords/descriptors or providing unsatisfactory retail experiences to users. This feedback mechanism is a singular rating designed to generally reflect a user's experience not only with a vendor's keywords but also with that particular vendor's overall customer-experience, including but not limited to locating that vendor, evaluating their listing, contacting that vendor, communicating with the vendor, finding that vendor, visiting that vendor, customer-service experience with that vendor and any follow-up service by that vendor. Vendor feedback is provided through various control mechanisms designed to prevent spurious feedback, including but not limited to multiple, false or virtual feedback from various entities, including but not limited to one particular user in a short period of time, computer automated programmed "bot" (i.e., robot) feedback or a vendor providing high quantities of biased feedback on itself. Security measures to prevent spurious feedback could include but not be limited to users registering with the Declassifind system a unique identifier (e.g., email, telephone number or other), passwords, a time limitation on feedback submission for one or multiple vendors, and optical character recognition tests.

Figure 5:
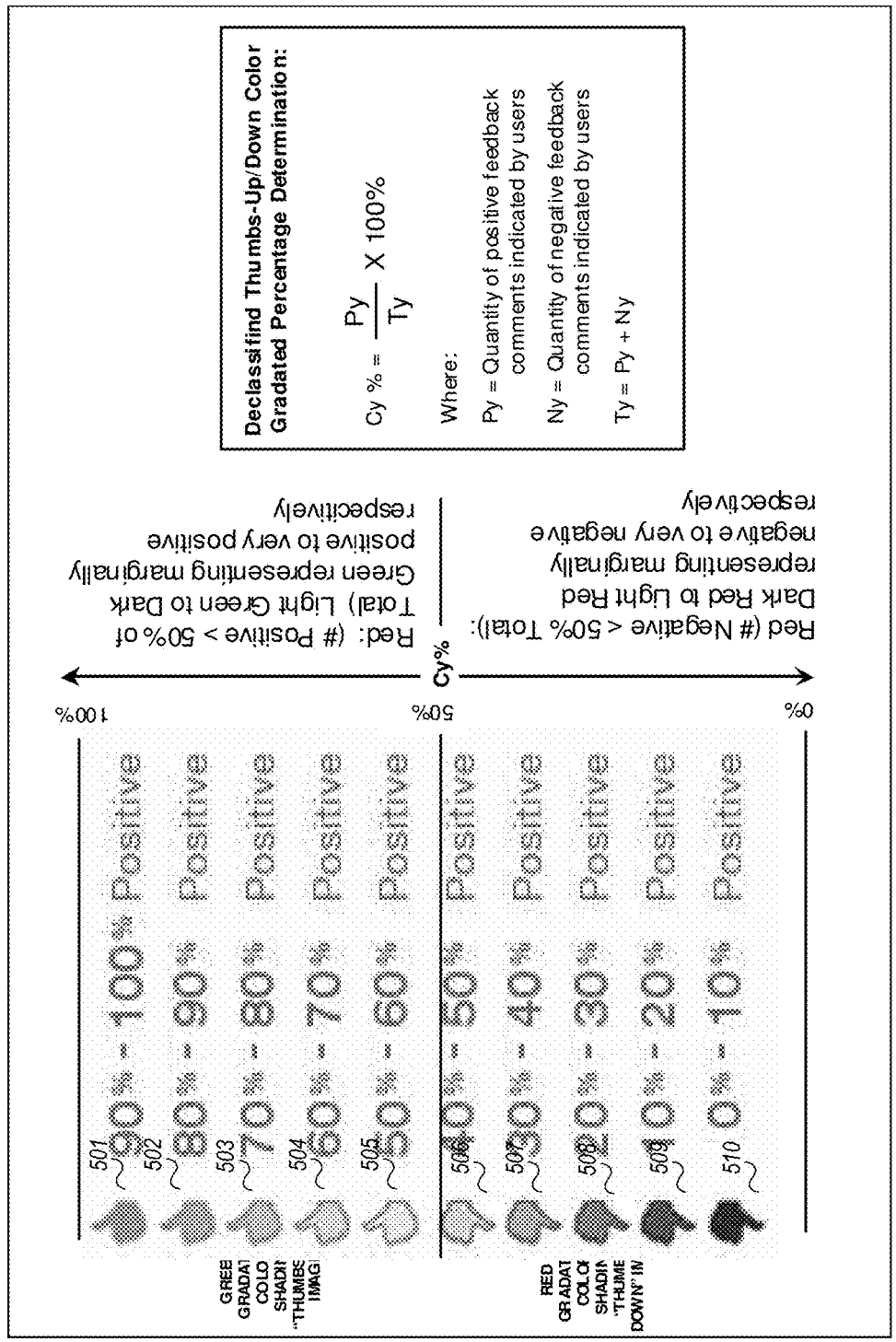
FIG. 5 illustrates an example approach to using color gradations to indicate vendor keyword ratings.

FIG. 5 illustrates an example approach to using color gradations to indicate vendor keyword ratings. In some embodiments, accomplishing a visual and instant rating of a vendors' keywords and descriptors is accomplished through a color gradated thumbs-up and thumbs-down icon scheme that is calculated utilizing the following algorithm where "$C_Y$" represents the feedback or comments coefficient for a particular vendor "Y" represented as a percentage.

$$Cy = \frac{Py}{Ty} \times 100\%$$

$P_Y$=Quantity of Positive Comments Received for Vendor Y $N_Y$=Quantity of Negative Comments Received for Vendor Y Ty=Py+Ny=Total Quantity of Positive and Negative Comments Received for Vendor Y In FIG. 5, the thumb icons nearer the ends of the range 0% to 100% are given a darker or more saturated level of color, such a darker or more saturated color indicates a more extreme value. For example, thumbs 501-505 may all be green, with thumb 501 being the darkest shade of green and thumb 505 being the lightest shade of green, such that thumb 501 indicates the highest level of accuracy or satisfaction. In addition, thumbs 506-510 may all be red, with thumb 510 begin the darkest shade of red and thumb 506 being the lightest shade of red, such that thumb 510 indicates a lowest level of accuracy or satisfaction.

For the explanatory purposes of this application, the colors green and red are used to represent positive and negative feedback respectively, however, any gradations of any one or two colors with the thumbs-up and thumbs-down iconography can be utilized for this purpose. Further, vendors will also have the ability to respond, in various ways, to users' feedback utilizing, but not limited to, custom comments and/or pre-formed responses. User feedback utilized in calculating a vendor's evaluation rating can be controlled and/or filtered by several parameters including but not limited to posting date and/or a pre-set quantity of feedback items utilized in calculating a vendor evaluation rating.

3C. Benefits: System

Declassifind moves consumers from searching for their desired goods and services through typically restrictive and overly-broad classifications or limited Advertisement-words to the ability to search directly for goods and services by name or more comprehensive, extensive and tangible keywords and descriptors based on their geographical locations. This saves consumers/users time and provides users in searching for desire products/services and provides vendors greater exposure to each other and their products and/or services. Vendors who cross-sell various products/services that are potentially missed when users search using traditional classified methods or limited Advertisement-words will have a higher probability of being located utilizing Declassifind search processes.

Declassifind avoids the classifications of traditional Yellow Pages' or other current goods and service search methods and takes consumers directly to their desired products through enabling merchandisers and vendors to broaden beyond their traditional classification listing or limited Advertisement-word(s) listing to a near-limitless number of inexpensive and comprehensive keywords and/or descriptor words (see FIG. 3). Keywords and descriptors could include but not be limited to:

broad classifications (as currently used in Yellow Pages)
    specific classifications (classifications not used now unless vendor pays for additional classifications
    actual item types (names of items and types)
    actual brand and trade names of items
    industry specific associations
    slang or lingo-associated item keywords or descriptors
    model numbers
    retailer's Stock-Keeping-Units (SKU's)
    other item-associated descriptors and/or keywords Declassifind provides product and service vendors with techniques for listing their products and wares with an almost limitless number of different self-selected or suggested descriptors or keywords (single or multi-worded) as they desire without being classified or "pigeon-holed" into limited single or multiple classifications or Advertisement-words. Vendors now have the option through Declassifind to list not just several keywords, descriptors, classifications or Advertisement-words, but rather hundreds (e.g., at least 100, at least 500, between 200 and 800) or thousands (e.g., at least 1000, at least 5000, at least 10000) of keyword/descriptor words.

Figure 6:
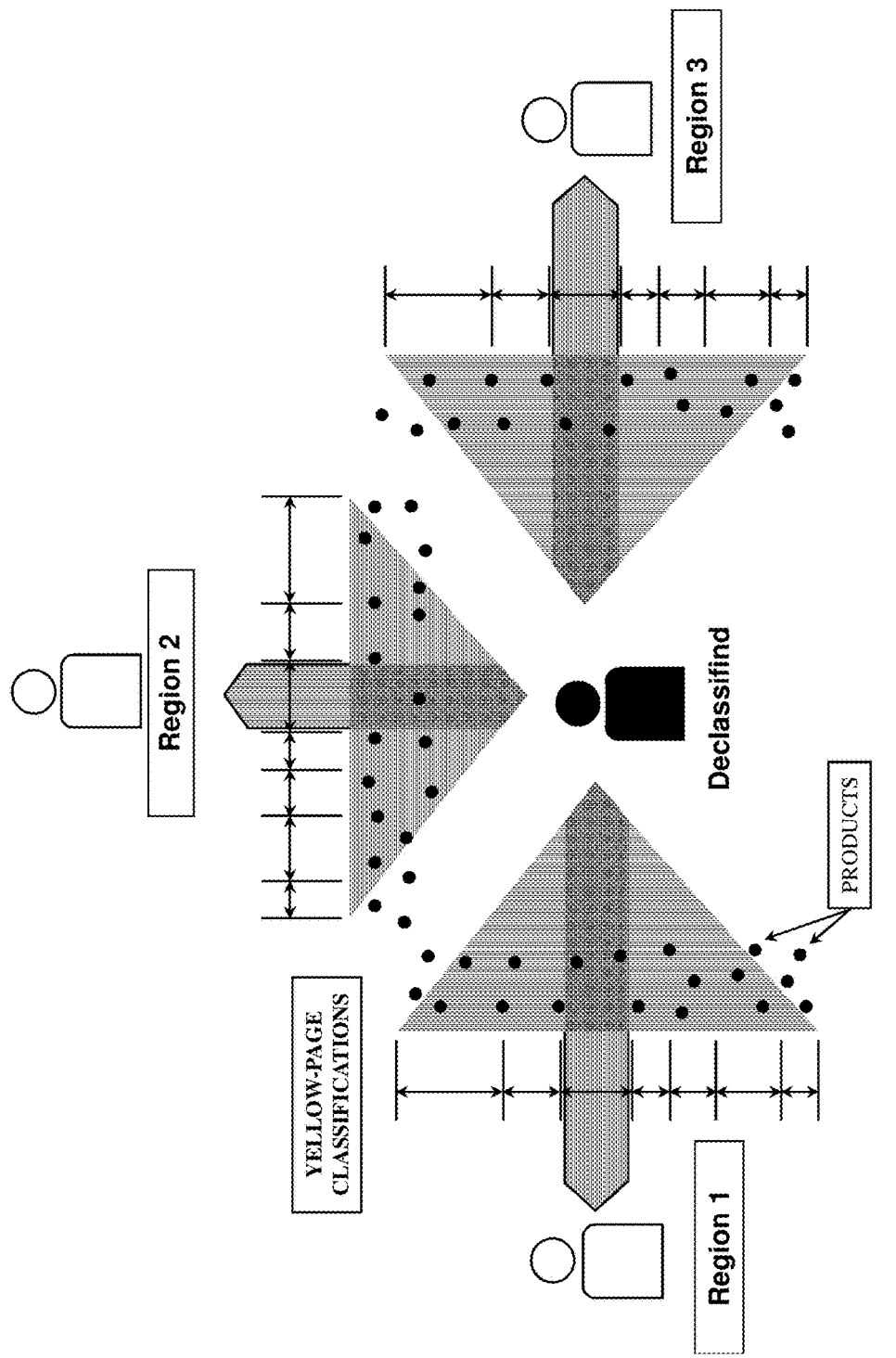
FIG. 6 illustrates cross-regional reach facilitated by some embodiments.

FIG. 6 illustrates cross-regional reach facilitated by some embodiments. In addition, due to Declassifind's utilization of Internet technology, consumers are free from the encumbrance of bulky paper-based and regional Yellow Pages which broaden their choice of search regions and thereby potentially increases vendors' geographic customer base through the increased accessibility across regions of the Internet electronically. Vendors can potentially reach other geographic "regional" markets that they may not have been listed in previously using traditional Yellow Pages. In FIG. 6, Declassifind can "see" (e.g., obtain and/or provide information for) multiple distinct geographic regions, each of may be served by a distinct Yellow Pages directory.

Users of the Declassifind system will also have the ability to gauge the reputation, reliability and other intangible characteristics of vendors on the system through user feedback/comments and through the use of the gradated color/shaded thumbs-up and thumbs-down icons/images. In this respect, Declassifind will have the ability to serve as a forum of opinions on retailers/vendors amongst consumers. In addition, this feedback mechanism will also serve as a self-regulating and self-moderating mechanism on the type, quantity and quality of the keywords and descriptors that merchants submit to the Declassifind system, i.e., retailers will not want to receive negative feedback/comments and will endeavor to ensure accuracy and truthfulness in the listing of their keywords/descriptors.

Vendors will have the ability to understand how well their keywords and descriptors are being sought after and searched on by Declassifind users. As opposed to current advertising or listing services, vendors are not easily able to list many words and assess the effectiveness of these words in reaching their markets. In addition, in the case of today's paper based listing services, users are unable to quickly and efficiently change their listings or keywords/descriptors in the case of an error or a preference change. Declassifind will allow vendors and merchants changes to their listings and keywords/descriptors instantly through an online Internet interface.

The Declassifind system provides merchants and vendors without Internet presence via Web sites or Web pages with the ability to simply and effectively have an online Internet presence. With current Internet search engines, a vendor must typically have an online presence or Web site in order to make their keywords and/or descriptors searchable. Utilizing Declassifind, vendors have the ability to list their descriptors and/or keywords on the Internet without the need to have a Web site for their retail business.

3D. Example Architecture

Figure 7:
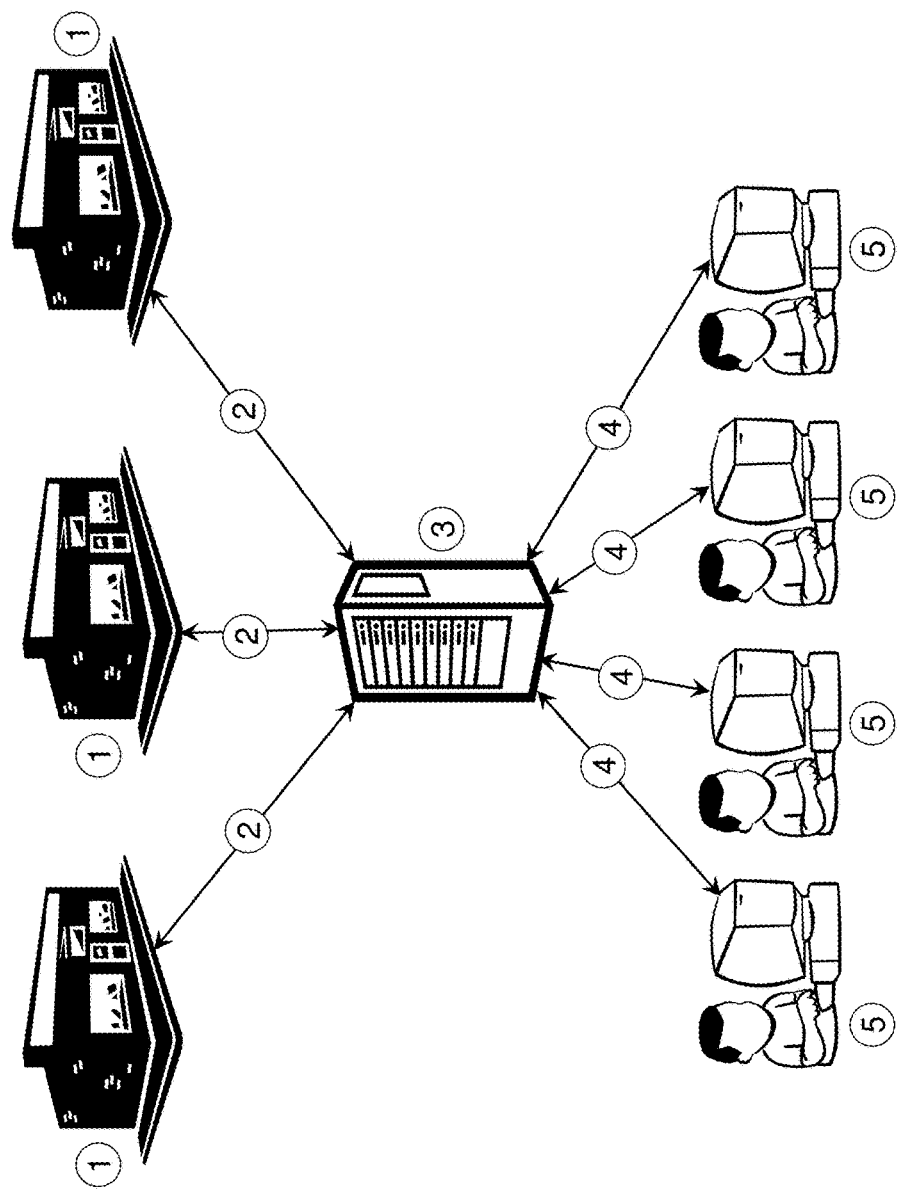
FIG. 7 illustrates example system components of one example embodiment.

FIG. 7 illustrates example system components of one example embodiment. One embodiment of Declassifind receives keyword submissions 2 from retail merchants and vendors 1. The Declassifind system resides on server 3. Declassifind users 5 operate client devices to interact or communicate 4 with the server 3.

In some embodiments, retail merchants and vendors 1 offer goods and items for sale in actual physical "bricks and mortar" locations. Vendors/retailers select keywords/descriptors to be listed with the Declassifind system.

Various keywords and descriptors are submitted 2 to the Declassifind Internet computer system servers 3 by merchants and vendors. Submission can be done through a variety of methods including but not limited to email, electronically through the Internet, verbally through a telephone, on paper through a fax machine and other methods of communication. Note that the submission process may, but not necessarily, occur with the aid of a Declassifind sales representative. Reports from the Declassifind system are also relayed back to vendors through a variety of methods, including but not limited to email, electronically through the Internet, verbally through a telephone, on paper through a fax machine and other methods of communication indicating frequency of searches for various keywords/descriptors within a geographical area and set time period. This can provide vendors with the ability to hone, refine and optimize their set of keywords/descriptors they select towards the increasing of their sales/revenues. Vendors/retailers also have the ability, in addition to receiving regularly generated reports, to query the Declassifind system on an as-needed custom basis as to frequency of user's searches on various/all keywords/descriptors in all/various geographies over preset/all time period(s).

Declassifind system and processes reside on server(s) 3. The Declassifind system includes various components of computer hardware and software required to fulfill the functionality of the Declassifind process including but not limited to Web server software and database software that provides the following functionality including one or more of:

1) Radial searches of vendors' keywords centered on a user's provided geographical location with vendor results returned and prioritized by proximity or straight-line distance to the user's center-of-search location. Other distance measures may be employed, including Manhattan distance, driving distance/time, public transit time, or the like.

2) Tracking and recording of user's searches by time and date, location and/or IP address.
3) Tracking and recording of user's feedback and comments for individual vendors
4) Registration and logging-in of users for vendor feedback submission
5) Generation of color-gradated thumbs-up/down icons associated and displayed with each0 vendor reflecting aggregate user feedback results on each vendor as analyzed by a predetermined algorithm
6) Vendor reports of user's keywords searched by time/date and geography and generated on:
   a) Preset frequency and quantity of most searched vendor listed keywords in their geographical location by a predetermined radius
   b) Flexible vendor queries generating custom reports on variable inputs for quantity of most or least frequently searched keywords, search radii and search regions/locations
7) Tracking and recording of sales associates associated with vendors
8) Tracking and recording of sales associates and their relationships and sponsoring/association with other sales associates (see Technique 6, below).

General public users 5 operate client devices (e.g., desktop computers, mobile devices, smart phones, tablets, laptops, kiosk systems) to interact 4 with the Declassifind system to input the desired item, service, code, or keyword they are searching for, their desired geographical search locale, and the desired limits or radius of their search. Upon completing their search and/or their investigation of the results provided by the Declassifind system, individual users can submit feedback and/or comments to the Declassifind system on various vendors. This feedback can take the form of but not necessarily be limited to a "positive" or "negative" rating and/or customized or preformed comments. Preformed comments could be a selection of standardized often-used comments such as "Keyword listed but item not carried," "Location hard to find or different from listing," "Communication difficult and vendor hard to reach," "Customer service poor" and/or others.

3E. Operation

The Declassifind system achieves its results through at least some of the following steps (A through E):

(A) Vendors and merchant retailers register on the Declassifind system providing information possibly including but not limited to the retailer's name, the retailer's location by geographical address, the retailer's email address, contact information and payment information. Vendors and merchant retailers then submit or list keyword(s) and/or descriptor(s) words to the Declassifind system (see Techniques 6 and 7, below, for techniques for increasing vendor registering and listing keywords with the Declassifind system). The keyword listing process is driven by the vendor inputting keywords that they wish to have associated with that vendor and particular to that geographical location, i.e. keywords may vary by vendor's geographic location (see Technique 12, below, for multiple location vendors and Technique 13, below, for an alternative suggestive keyword listing process). Vendors are charged by word quantity through a variety of rate structures (see Technique 23, below, for a listing of potential rate structures and Technique 7, below, for an initial free block of free words to incentivize vendors/retailers to initially list with the Declassifind system)

(B) Users access the Declassifind system (see Techniques 2, 3, 4, 5, and 18, below) and search on their desired items inputting into the system their desired item via keywords and descriptors (see Technique 14, below, for assisting users with keyword/descriptor input and Technique 15, below, for potential "smart" suggestive search user aids) along with their desired geographical search location center (see Technique 19, below, for alternative techniques for location input) and their desired search radius around that geographical center (see Techniques 22 and 26, below, for potential alternatives to radial circular searches). Desired search radius can also be a default value that is utilized by system if not adjusted by user.

(C) The Declassifind system then searches its databases for vendors with those keywords and/or descriptors and which fall within the radius around the desired search location center including but not limited to address, postal/zip code, city/state or telephone area code and presents a listing of these vendors to the user in the order of nearest proximity measured by linear distance to the user's selected search location (see Techniques 22, 24, 25 and 26, below, for potential other parameters users can use to query, segregate and/or parse their searches; see Technique 27, below, for potential display of item's pricing).

(D) The user can then further access and assess the vendor listing results found through the Declassifind system of the exact geographical location of desired vendors who carry or list items matching the user's desired keywords and/or descriptors via the physical street addresses of vendors and/or a graphical map representation of vendors locations in relation to a user's location by clicking on hyperlinks associated with each vendor listing (see below for Techniques 22 and 26 for alternatives to absolute radial distance search vendor prioritization in displaying listing results; Techniques 9 and 10 that would allow users a mechanism to return easily to favorite vendors and/or share these vendors with other users and Techniques 16 and 17 that could potentially allow users to assess inventory and/or availability of their desired product/service and possibly order/purchase/hold items; see Techniques 27 for potential display of item's pricing).

(E) Users can then also submit their overall feedback on a vendor in the form of a single binary positive (e.g., thumbs-up) or negative (e.g., thumbs-down) selection (see below for Techniques 20 for alternative to overall vendor feedback and 21 for possible option to binary feedback) and if desired, associated comments (see Techniques 1 and 11, below, for a registration alternative for users to submit feedback and an alternative for feedback limiting mechanisms to suppress faulty, exaggerated, self-serving, overly and falsely positive feedback on vendors). User comments when submitting the single vendor binary positive or negative feedback could a set of pre-formed generic statements and/or could be an open text field limited in character length (see Technique 8, below, for potential mechanism giving vendors the mechanism to respond to user's comments).

Figure 8A:
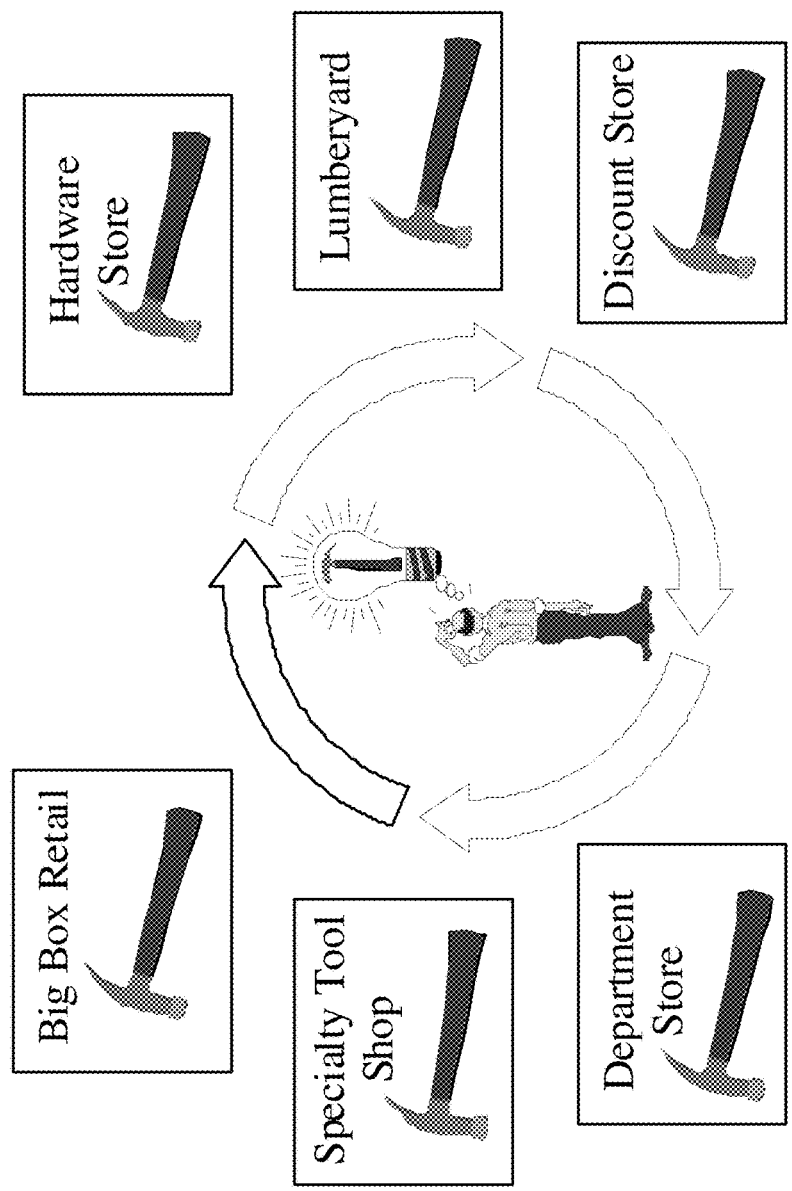
FIGS. 8A-8D illustrate an example usage scenario in an example embodiment.

FIGS. 8A-8D illustrate an example usage scenario in an example embodiment. FIG. 8A illustrates the traditional dilemma faced by consumers attempting to locate items across various types of vendors. In FIG. 8A a user/person desires to find a particular item in their local region—for these purposes, a hammer. Under traditional Yellow Page classification search methods, that person would have to determine what kind of store, or store classification, would likely carry hammers. More than likely, this person would think of "Hardware" stores and consult that local Yellow Page's classification, "Hardware," seeking hardware stores that would likely carry hammers.

Figure 8B:
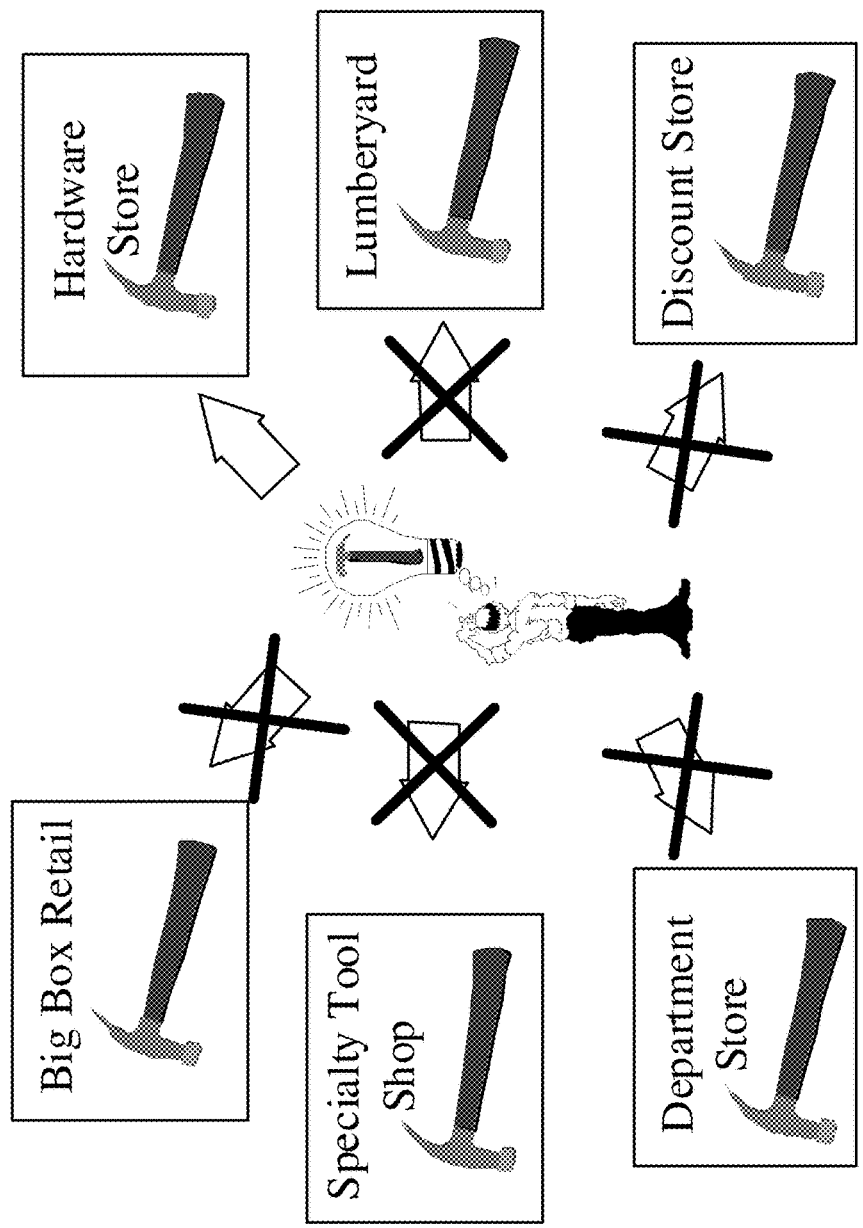

FIG. 8B illustrates potential classifications that may be missed by a person utilizing a traditional approach to locating a good or service. In particular, locating stores in the above manner would not necessarily encompass other possible classifications of stores that might also carry hammers potentially including big box retail stores, specialty tool stores, department stores, lumberyards, and/or discount stores.

Figure 8C:
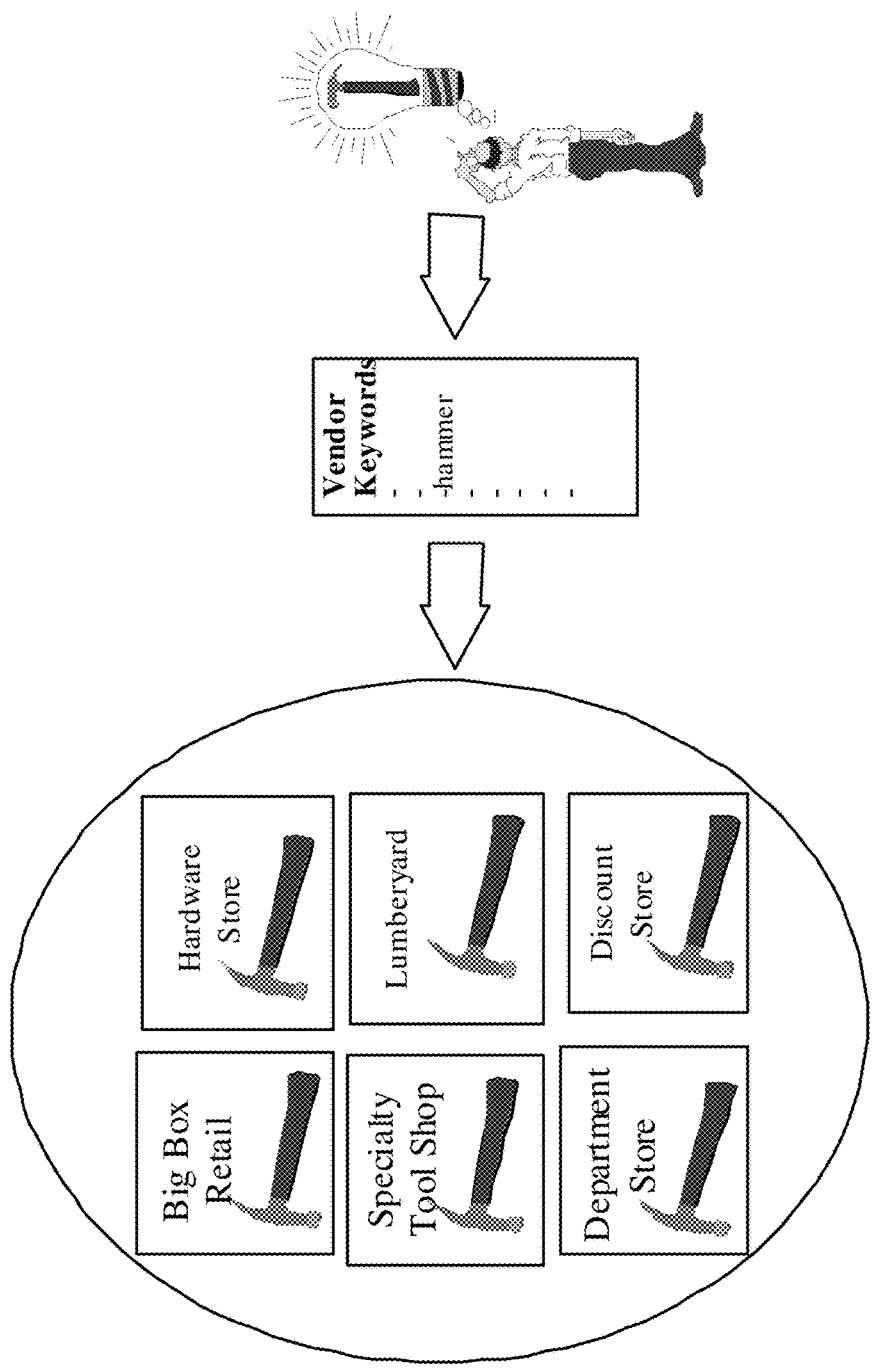

FIG. 8C illustrates improved results provided using Declassifind. Utilizing

Declassifind, however, a person could simply search on "hammer" directly and locate each of these potential stores that list "hammer" in their keyword listing within their desired region of search.

Figure 8D:
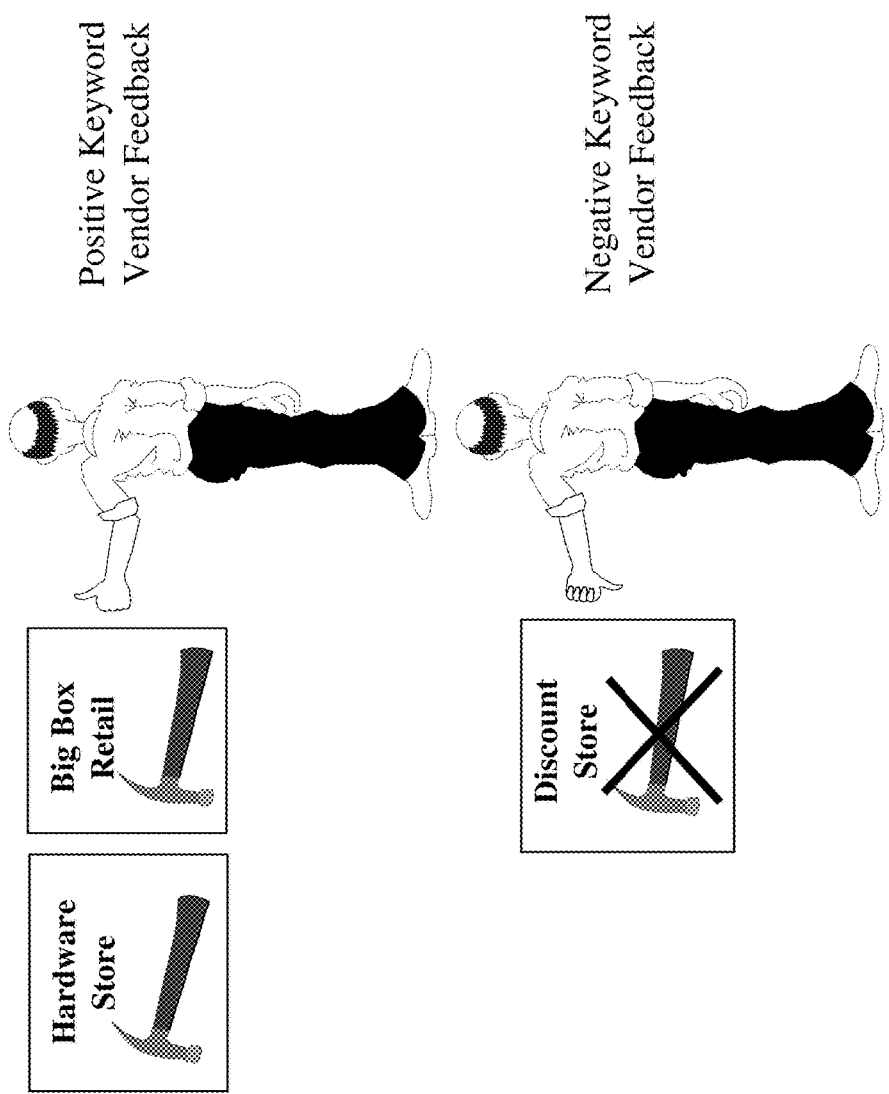

FIG. 8D illustrates a feedback mechanism provided by one embodiment. It is recognized that the potential exists for vendors to "overlist" or list too many keywords with which their trade or services have no association. In order to prevent this, Declassifind provides users with the ability to provide feedback on a vendor's particular listing of a keyword or descriptor so that future users can review a vendor's accuracy record of keywords and descriptors they have listed as associated with their particular retail or service location. This feedback mechanism is a singular rating designed to generally reflect a user's experience not only with a vendor's keywords but also with that particular vendor's overall customer-experience including but not limited to locating that vendor, evaluating their listing, contacting that vendor, communicating with the vendor, finding that vendor, visiting that vendor, customer-service experience with that vendor and any follow-up service by that vendor. Vendor feedback is provided through various control mechanisms designed to prevent spurious feedback including but not limited to multiple, false or virtual feedback from various entities including but not limited to one particular user in a short period of time, computer programmed "bot" feedback or a vendor providing high quantities of biased self-feedback. Security measures to prevent spurious feedback could include but not be limited to users registering with the Declassifind system a unique identifier (e.g., email, telephone number or other), passwords, a time limitation on feedback submission for one or multiple vendors, and optical character recognition tests.

3F. Alternatives and/or Enhancements

Alternative or additional techniques that the Declassifind system may use to achieve its results may or may not include one or several of the following. Even though the following techniques are in some cases listed or described as "alternatives," they may in some embodiments appear in conjunction with one another.

Technique 1—Users Register in Order to Submit Feedback: An optional feature that the Declassifind system might use would be to have users register with the system in order to ensure that vendor/retailer feedback parameters remain uniformly controlled, consistently input and residing within one discrete database for accurate generation of overall rating of vendors/retailers—in addition to also having the means to control frequency of comments and feedback on vendors (see Alternative 11 below). User registration data might include but not be limited to the user's email address, a user name, user's address, telephone number, and various search preferences.

Technique 2—Wireless Access: An optional feature that the Declassifind system might utilize would be enabling its users and/or vendors access the system through wireless devices including, but not limited to, cellular mobile phones, personal digital assistants, laptop/notebook computers and any other devices that can wirelessly access systems remotely using a wide variety of wireless technology protocols and standards.

Technique 3—Voice Activated: An optional feature that the Declassifind system might utilize would be enabling users to access the system using voice commands instead of the Internet. Users could utilize a telephone to call the Declassifind system and state their query and the Declassifind would use voice recognition technology to translate the users' queries. Results of users' queries could be given back via voice or the display on their computer screen or telephone screen.

Technique 4—Wireless Common Short Code Text Messaging Access: An optional feature that the Declassifind system might use for user access to the system would be Common Short Code (CSC) text messaging on user's cellular mobile phones. Users could text message their queries using, but not limited to, 4, 5 or 6 digit CSC cellular/mobile phone text messaging addresses. Results of their queries would be returned back to users' phones via text message. User comments and feedback could also be submitted via cellular mobile phone text messaging using the CSC text messaging address.

Technique 5—Open API Interface Requirements: An optional feature that the Declassifind system could incorporate is an open "Application Program Interface" (API) interface for other Web sites/search engine systems to access the Declassifind system that would enable these other systems to submit user keyword and location queries to the Declassifind system and receive vendor data back to be presented by their own systems Web sites. Access through an open API protocol would allow other Internet search engines, Web portals/sites and the like to query the Declassifind system and receive the same vendor information available to standard direct users of the Declassifind system. These other entities (search engines, Web portals/sites, etc.) could freely access the Declassifind system through predetermined protocols and could query the system for their own users. Data returned back from these queries could then be branded, stylized and edited by these other entities for their own uses. This open API feature of the Declassifind system would also ensure that maximum exposure is achieved for vendors/retailers listing their keywords/descriptors with the systems.

Technique 6—Multi-Level Mentoring Vendor-Listing Selling Approach: Declassifind might utilize a multi-tiered sales mentorship and rewards methodology for sales representatives (e.g., salesperson, sales associate, sales rep) to increase its vendor listings. Sales representatives assist vendors with the process of registering as a listed vendor on the Declassifind system and building relationships with vendors to increase the comfort level with the system and increase the level of their keyword listings. Sales representatives would be segregated by level of experience and/or existing accounts. Greater experienced sales representatives (with possibly a preset level of existing accounts) would provide mentoring and support to lesser experienced or less-established sales representatives; while receiving a share of their mentoree's sales.

An optional implementation methodology that the Declassifind system could utilize in populating its databases with merchants and sales representatives could involve a multi- or single-level marketing sales strategy. This multi- or single-level marketing sales system would provide sales representatives with a commission on his or her own sales and commissions on the sales from each person he or she directly recruits to become a sales representative "downline"

a level from themselves. However there would be no limits or caps on the maximum number of sales representatives on each level or the number of levels each sales representative could recruit or maintain "below" them. Requirements for each level to achieve and maintain that level could vary widely and be tailored to achieve a wide variety of objectives including but not limited to market penetration, profitability, and/or revenue.

Additional details regarding an example multi-level marketing strategy are provided in Appendix A.

Technique 7—Initial Free Listing of Limited Quantity of Keywords/Descriptor: An optional implementation methodology that the Declassifind system could utilize in populating its databases with merchants would be to offer an initial limited quantity of keywords/descriptors to vendors at no-charge to incentivize and expose vendors to the advantages of the Declassifind system.

Technique 8—Vendors Ability to Respond to Feedback: An optional feature that the Declassifind system could institute would be to offer vendors and retailers who list keywords/descriptors with the Declassifind system the ability to respond to user comments/feedback. This would more likely be a desired feature for vendors in responding to negative feedback/comments however this feature would be also available for positive feedback/comments as well. Upon receiving feedback/comments from users, vendors/retailers have the opportunity to respond back to any variety of feedback/comments with their own comments and other pertinent rebuttal information useful to other users. Vendors' response to users' feedback/comments can take the form of, but not be limited to, customized or preformed phrases, comments or paragraphs.

Technique 9—User Ability To "Tag" and Compile Their Favorite Retailers: An optional feature that the Declassifind system could institute would be to offer users the ability to tag or bookmark vendors or retailers that they have located on the system with notes or indicators. This tagging or bookmarking would enable users to quickly locate vendors that a user would like to remember or return to.

Technique 10—User's Ability to Share Vendors with Other Users: Users may wish to share a vendor with other users and could utilize email or social networking (e.g., Facebook) or broadcasting (e.g., Twitter) Web sites to forward or post a vendor listing or information on that vendor to another user.

Technique 11—Limiting Mechanisms on User Feedback: An optional feature that the Declassifind system could institute would be limiting the quantity of feedback thereby eliminating user's ability to potentially inequitably inflate negative or positive feedback/comments for a particular retailer/vendor. User feedback could be controlled in conjunction with Alternative No. 1 of registering users through various mechanisms including but not limited to:
  limiting the quantity of feedback to a pre-set quantity utilized in calculating a vendor's evaluation rating
  limiting the feedback to user feedback that has not been responded to by a vendor
  limiting the calculation of a vendor's evaluation to feedback received within a pre-set period of time thereby allowing feedback to expire over time Technique 12—Vendor/Retailer Multiple Locations: An optional feature that the Declassifind system could institute would be to permit retailers/vendors to list multiple locations under one listing of their business name with the same general set of keywords. In this case, user's geographic searches would still find the nearest vendor locations to them however when selected by the user to further view contact and location information, nearest retail locations by proximity would then be viewable similar to other typical Declassifind searches. Individual locations would remain as standalone discrete data sets within the Declassifind system for the purpose of feedback and listing specialized keywords beyond or in addition to the general keyword set for all locations. All feedback, ratings, rankings and/or comments could still accrue to specific locations of the vendor/retailer to ensure that feedback displayed is local and pertinent to a user in that location and geography.

Technique 13—Suggestive Keyword Listing for Vendors: An optional feature that could be incorporated into the Declassifind system would be a feature that would provide vendors with possible keywords that they might not have considered associating with their listing. This would likely be driven by an index of terms that would point vendors to other indexes of associated keywords or search terms users might input in trying to locate them.

Technique 14—Corrective Misspelling of Items' Descriptors/Keywords: An optional feature that the Declassifind system could incorporate would be the addition of algorithms and rules that would aid users in the case of their misspelling an item that they are searching for. The Declassifind system would have the ability to understand, despite the misspelling of various items' keywords/descriptors, what the user is looking for and return the desired results back to the user.

Technique 15—Anticipative "Smart" Search Methods: An optional feature that the Declassifind system could implement would be the use of suggestive "smart" search technology that utilizes artificial intelligence or various algorithms and rules in helping users find their desired items or keywords/descriptors. Users' searches would be potentially aided by the incorporation of this suggestion technology which would anticipate and learn through various predictive pattern recognitions what users generally search on and are likely to be ultimately looking for and then suggest this predictive data back to the user. This smart technology would allow users to be more efficient in finding their desired items.

Technique 16—Inventory Status of Retailer/Vendor Items: An optional feature that the Declassifind system could incorporate into its systems would be giving its users the ability to ascertain the inventory level of items at a particular retailer/vendor's location through the Declassifind system accessing a vendor's enterprise resource planning system.

Technique 17—Online Ordering/Purchase/Holding of Vendor/Retailer Items: A set of optional features that the Declassifind system could potentially incorporate into its systems and processes would be giving its users the ability to directly order, purchase or hold sought after items using the Internet through the Declassifind system from retailer/vendor's locations.

Technique 18—Internet-Enabled Phone "Application": As an alternative to accessing the Declassifind system through a traditional Internet Web site or Internet portal, the Declassifind system could also be accessed through a smaller applet or application program residing on a wireless Internet enabled telephone.

Technique 19—GPS-Enabled Smart-Phone or Mobile Internet Device: As an alternative to users entering their search location, users who access the Declassifind system on a Global-Position-System (GPS) enabled device capable of defining their particular geographical location could utilize the device's locating ability to provide the Declassifind system with the geographical information correlating to their device location which in turn the Declassifind system would then use as its center of a radial proximal search.

Technique 20—Multi-Faceted User Evaluation on Vendor Characteristics: In addition to and/or rather than one sole general overall evaluation for each vendor, users could also provide feedback by several or many different characteristics associated with a vendor corresponding to user's evaluation on each of these characteristics. These characteristics could include but not be limited to quality of keyword listing, ease of communication, location, customer service, value, customer experience, goods availability, purchase ease and/or follow-up service. These multi-faceted evaluations would not necessarily have to display immediately in a broad overall listing of several vendors but could be displayed upon a user's viewing of that particular vendor's profile and detailed information.

Technique 21—Optional Linear Variable Scale Feedback: A potential alternative to the binary feedback choice of a thumbs-up (positive) or a thumbs-down (negative), users could submit their feedback on a scaled response continuum of negative to positive, for example: 1-10 or 1-5. In addition, alternative icons to thumbs could also be utilized, e.g., stars, smiley faces, etc.

Technique 22—Alternative Search Parameters to Proximal Radial Searches: A potential alternative to the Declassifind system's radial area circular-shaped searches could be a search based on non circular-shaped search area. These could be geometric, e.g., a square, rectangle, etc. or regional, e.g., a district or neighborhood. In some cases, search results could still be returned by proximity or overall straight-line distance to a user's defined center of search location. However searches would be performed in a non-circular area.

Technique 23—Keyword Pricing Alternatives: Keyword pricing could be structured in a variety of pricing mechanism including but not limited to and also potentially taking Alternative 7, free initial block of words, into account:
  declining-block rate structure: i.e., the cost of a block of keywords decreases as the total number of keywords purchased increases
  flat-rate pricing per any and all words
  linear declining-scale pricing
  increasing scale pricing Technique 24—Hours of Operation Search Feature: The Declassifind system may elect to offer an option for its users when searching to provide only results for those retailers/vendors whose hours of operation coincide with the current time or a set window time period around the current time of search to provide users with results of accessible vendors/retailers and their goods or services.

Technique 25—Alternative Parameter Searches: The Declassifind system could offer users the option of searching on parameters other than proximity of vendors/retailers, including but not limited to:
  Types or degrees of feedback including highest, lowest or specific levels of positive or negative feedback
  Names of vendors
  Vendors with specific information, e.g., phone numbers, Web sites, etc.

Technique 26—Alternative Search Prioritization: The Declassifind system could offer users the alternative to an absolute radial "as the crow flies" proximity prioritization of vendors of an optimized most efficient routing utilizing alternative methods of transportation including but not limited to:
  Automobile
  Metropolitan transit systems (buses, streetcars, subways, etc.)
  Walking
  Bicycling Technique 27—Vendor Price Listing Information: An additional feature to could potentially allow retailers to display an item's pricing to users when either a) the initial listing of vendors/retailers presented to users upon a keyword search is displayed or b) the user accesses further information on a particular vendor/retailer by clicking on the hyperlinks associated with that particular vendor/retailer.

Technique 28—Search Results Filtering and/or Sorting: An additional feature that could enhance and simplify the display of search results allowing users to more efficiently hone in on what they are looking for would be filtering and/or sorting of these results by various user-selected criteria including but not limited to:
  Neighborhood
  Direction (N, S, E, W, NE, SE, NW, SW, etc.)
  Zip Code
  Region
  Street
  Vendor Ratings (greater than, less than, from/to)
  Primary Business Classifications
  Hours and/or Days of Operation Technique 29—Reputation Management and Merchant Verification: An additional feature may be managing or otherwise protecting the reputation of merchants. One embodiment may attempt to recognize the potential for abuse by a person wishing to slander, libel, or defame a business by providing a merchant's name (e.g., Wal-Mart) and risque, faulty and/or questionable key words. Other embodiments may attempt to verify provided information for correctness and/or accuracy, such as by determining whether a correct address has been given.

In some cases, the thumbs-up and thumbs-down feedback feature may help to regulate such behavior and/or control for inaccurate information. However, some reputation damage may still occur between the time that keywords are associated with a merchant and the time that negative feedback is received. Thus, some embodiments may verify the veracity of a keyword listing, for example by verifying the identity of the person who is providing keywords (e.g., that the person actually is who he says he is), verifying the authority of the person providing they keywords (e.g., that they have speaking authority for the merchant), verifying other provided information (e.g., performing an address check). Such verification may be performed in an automated, manual, or semi-automated manner, such as by initiating background checks, ordering credit reports, doing address lookups, initiating human contacts (e.g., contacting the merchant's human resources department), or the like. Various actions may be taken in response to a determination that the person providing keywords does not have the authority to do so. Such actions may include one or more of:
  In the case of faulty or false address associations with that merchant, removal of that particular vendor location
  the provided keywords may be automatically disassociated from the merchant and/or their goods or services
  the person without authority may be prohibited or barred from providing additional keywords for the merchant and/or other merchants
  the merchant may be contacted to inform the merchant that an unauthorized person is attempting to provide keywords on the merchant's behalf All of the above U.S. patents, U.S. patent application publications, U.S. patent applications, foreign patents, foreign patent applications and non-patent publications referred to in this specification and/or listed in the Application Data Sheet, including but not limited to U.S. application Ser. No. 13/297,948, filed Nov. 16, 2011, titled "SEARCHING FOR GOODS AND SERVICES BASED ON KEYWORDS AND PROXIMITY," now U.S. Pat. No. 9,092,815, and U.S. Provisional Application No. 61/414,280, filed Nov. 16, 2010, titled "SEARCHING FOR GOODS AND SERVICES BASED ON KEYWORDS AND PROXIMITY," are incorporated herein by reference, in their entireties.

From the foregoing it will be appreciated that, although specific embodiments have been described herein for purposes of illustration, various modifications may be made without deviating from the spirit and scope of the invention. For example, the methods and systems for performing proximity- and keyword-based search techniques discussed herein are applicable to domains other than bricks and mortar merchants. For example, the techniques can be used to provide information about public institutions, such as social services, schools, parks, or the like. Also, the methods and systems discussed herein are applicable to differing mobile device protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system, comprising:
providing a computer-implemented search facility configured to provide information about a plurality of merchants that each sell a plurality of goods and/or services, wherein each merchant of the plurality of merchants does not have an online presence via web sites or web pages specific to each merchant, by:
for each of the plurality of merchants,
receiving a plurality of keywords that describe goods or services sold by the merchant, wherein the plurality of keywords comprises thousands of keywords, descriptors, classification, or advertisement words; and
associating each of the plurality of keywords with at least one of the goods and/or services sold by the merchant;
receiving a search request that includes a keyword and an indication of a location;
automatically determining, by a computer processor of the computing system, one or more of the plurality of merchants that is proximately located to the indicated location and that sells a good and/or service that has an associated keyword that matches the keyword included in the search request, wherein the one or more of the determined plurality of merchants is classified in an off-line directory service only under business classifications that do not deal in the good and/or service, such that the merchant would not be identified in the off-line directory as dealing in the good and/or service were the off-line directory to be searched under business classifications associated with the good and/or service, thereby enabling the determining of one or more of the plurality of merchants proximately located to the indicated location that would not be otherwise found by searching the off-line directory service;
transmitting information about the determined one or more merchants; and
receiving feedback regarding one of the plurality of merchants, the feedback indicating a user's positive or negative experience with respect to the one merchant and/or one or more keywords associated with the one merchant and automatically adjusting the accuracy of received feedback associated with the one merchant by only associating the received plurality of keywords with the associated good and/or services of the one of the plurality of merchants when received from an authorized entity by:
automatically determining whether the feedback is likely false or spurious by determining that the feedback was at least one of; received from an unauthorized user, received along with multiple feedback from a single user in a short amount of time, or received from an automated computer program;
upon determining that the feedback is likely false or spurious, not presenting or associating the received feedback with the one merchant, and
otherwise, presenting and associating the received feedback with the one merchant.

2. The method of claim 1 wherein each of the plurality of merchants has an associated primary business classification that includes one or more goods and/or services, and wherein determining the one or more of the plurality of merchants includes determining one or more merchants that each have a primary business classification that does not include the good and/or service that has an associated keyword that matches the keyword included in the search request.

3. The method of claim 2, further comprising:
transmitting information about one or more merchants that each have a primary business classification that does not include a good and/or service searched for by a potential customer who is using the search facility.

4. The method of claim 1, further comprising:
receiving, from a sales representative, information about a merchant, the information including a name of the merchant, a location of the merchant, contact information for the merchant, and one or more keywords that describe goods and/or services sold by the merchant, wherein the sales representative is not affiliated with the merchant.

5. The method of claim 4, further comprising:
providing compensation to the sales representative in exchange for the information about the merchant.

6. The method of claim 1, further comprising:
ordering the information about the determined one or more merchants, based at least in part on proximity between each of the one or more merchants and the indicated location.

7. The method of claim 1 wherein determining the one or more merchants includes determining one or more merchants that have a location within a specified radius of the indicated location.

8. The method of claim 1, further comprising:
upon determining that the feedback is not likely false or spurious, transmitting an indication of a rating of the one merchant, the rating based at least in part on the user's positive or negative experience.

9. The method of claim 8 wherein transmitting the indication of the rating includes transmitting a directional indicator that is oriented in an upwards or downwards direction, the upwards direction indicating a positive rating and the downwards direction indicating a negative rating.

10. The method of claim 9 wherein the directional indicator includes a color having a level of darkness that indicates a magnitude of the rating, automatically calculated by the computing system, such that the magnitude of the rating increases as the level of darkness increases.

11. The method of claim 10 wherein the directional indicator is a thumb icon, wherein the thumb icon is red when the rating is negative, and wherein the thumb is green when the rating is positive.

12. The method of claim 1, wherein the plurality of keywords are provided from an entity on behalf of one of the plurality of merchants, and further comprising:
determining whether or not the entity is authorized to provide the plurality of keywords on behalf of the one of the plurality of merchants;
when it is determined that the keywords are provided by an entity authorized to provide the keywords on behalf of the one of the plurality of merchants, associating the plurality of keywords with the at least one of the goods and/or services sold by the one of the plurality of merchants; and
when it is determined that the keywords are not provided by an authorized entity, disassociating the plurality of keywords from the at least one of the goods and/or services sold by the one of the plurality of merchants.

13. The method of claim 12, further comprising:
when it is determined that the keywords are not provided by an authorized entity, transmitting an indication to the one of the plurality of merchants that the entity has attempted to provide keywords without authority.

14. The method of claim 12, further comprising:
when it is determined that the keywords are not provided by an authorized entity, prohibiting the entity from providing further keywords for the one of the plurality of merchants and/or others of the plurality of merchants.

15. A computing system, comprising:
a non-transitory memory; and
a module stored on the memory that is configured, when executed by a computer processor, to provide a search facility configured to provide information about a plurality of merchants that each sell goods and/or services, wherein each merchant of the plurality of merchants does not have an online presence via web sites or web pages specific to each merchant, by:
for each of the plurality of merchants,
receiving a plurality of keywords that describe goods or services sold by the merchant, wherein the plurality of keywords comprises hundreds of keywords, descriptors, classification, or advertisement words; and
associating each of the plurality of keywords with at least one of the goods and/or services sold by the merchant;
receiving a search request that includes a keyword and an indication of a location;
automatically determining one or more of the plurality of merchants that is proximately located to the indicated location and that sells a good and/or service that has an associated keyword that matches the keyword included in the search request, wherein the one or more of the determined plurality of merchants is classified in an off-line directory service only under business classifications that do not deal in the good and/or service, such that the merchant would not be identified in the off-line directory as dealing in the good and/or service were the off-line directory to be searched under business classifications associated with the good and/or service, thereby enabling the determining of one or more of the plurality of merchants proximately located to the indicated location that would not be otherwise found by searching the off-line directory service;
transmitting information about the determined one or more merchants; and
receiving feedback regarding one of the plurality of merchants, the feedback indicating a user's positive or negative experience with respect to the one merchant and/or one or more keywords associated with the one merchant and automatically adjusting the accuracy of received feedback associated with the one merchant by only associating the received plurality of keywords with the associated good and/or services of the one of the plurality of merchants when received from an authorized entity by:
automatically determining whether the feedback is likely false or spurious by determining that the feedback was at least one of: received from an unauthorized user, received along with multiple feedback from a single user in a short amount of time, or received from an automated computer program:
upon determining that the feedback is likely false or spurious, not presenting or associating the received feedback with the one merchant; and
otherwise, presenting and associating the received feedback with the one merchant.

16. The computing system of claim 15 wherein at least a thousand keywords are associated with goods and/or services sold by each merchant.

17. The computing system of claim 15 wherein the module is a merchant information search system.

18. A non-transitory computer-readable medium having contents that, when executed, cause a computing system to provide information about a plurality of merchants that each sell goods and/or services, by:
for each of the plurality of merchants, wherein each merchant does not have an online presence via web sites or web pages specific to each merchant,
receiving a plurality of keywords that describe goods or services sold by the merchant, wherein the plurality of keywords comprises thousands of keywords, descriptors, classification, or advertisement words; and
associating each of the plurality of keywords with the merchant and/or with at least one of the goods and/or services sold by the merchant;
receiving a search request that includes a keyword and an indication of a location;
automatically determining one or more of the plurality of merchants that sells a good and/or service that has an associated keyword that matches the keyword included in the search request, wherein the one or more of the determined plurality of merchants is classified in an off-line directory service only under business classifications that do not deal in the good and/or service, such that the merchant would not be identified in the off-line directory as dealing in the good and/or service were the off-line directory to be searched under business classifications associated with the good and/or service, thereby enabling the determining of one or more of the plurality of merchants proximately located to the indicated location that would not be otherwise found by searching the off-line directory service;
transmitting information about the determined one or more merchants; and
automatically adjusting the accuracy of the received plurality of keywords with the associated good and/or services of one of the plurality of merchants by only associating the received plurality of keywords with the associated good and/or services of the one of the plurality of merchants when received from an authorized entity by;

automatically determining whether the feedback is likely false or spurious by determining that the feedback was at least one of received from an unauthorized user, received along with multiple feedback from a single user in a short amount of time, or received from an automated computer program;

upon determining that the feedback is likely false or spurious, not presenting or associating the received feedback with the one merchant; and otherwise, presenting and associating the received feedback with the one merchant.

19. The computer-readable medium of claim 18 wherein the computer-readable medium is a memory in the computing system, and wherein the contents are instructions that, when executed, cause the computing system to perform the method.

20. The computer-readable medium of claim 18 wherein at least a thousand keywords are associated with goods and/or services sold by each merchant.

21. The computer-readable medium of claim 18 wherein the off-line directory is a yellow pages service.

* * * * *

UNITED STATES PATENT AND TRADEMARK OFFICE
CERTIFICATE OF CORRECTION

PATENT NO. : 10,007,945 B2
APPLICATION NO. : 14/748063
DATED : June 26, 2018
INVENTOR(S) : Markus Foerster Page 1 of 1

It is certified that error appears in the above-identified patent and that said Letters Patent is hereby corrected as shown below:

In the Claims

In Column 22, Line 5 (Claim 1), "services" should be --service--.

In Column 22, Line 9 (Claim 1), ";" should be --:--.

In Column 22, Line 16 (Claim 1), "," should be --;--.

In Column 24, Line 13 (Claim 15), "services" should be --service--.

In Column 24, Line 21 (Claim 15), ":" should be --;--.

In Column 25, Line 1 (Claim 18), "services" should be --service--.

In Column 25, Line 3 (Claim 18), "services" should be --service--.

In Column 25, Line 8 (Claim 18), insert --:-- after "of".

Signed and Sealed this
Twenty-eighth Day of August, 2018

Andrei Iancu
*Director of the United States Patent and Trademark Office*